United States Patent
Charlton et al.

(10) Patent No.: US 9,999,971 B2
(45) Date of Patent: Jun. 19, 2018

(54) ERGONOMIC AUTOMATED WORKSTATION

(71) Applicant: THE BOEING COMPANY, Chicago, IL (US)

(72) Inventors: Craig Charlton, Charleston, SC (US); Andrew Michael Huckey, Charleston, SC (US); Jake Aspen Wilson, Charleston, SC (US); Mark Edward Nestleroad, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 320 days.

(21) Appl. No.: 14/831,176

(22) Filed: Aug. 20, 2015

(65) Prior Publication Data
US 2017/0050308 A1 Feb. 23, 2017

(51) Int. Cl.
| | | |
|---|---|---|
| G06F 19/00 | (2018.01) | |
| A47B 9/00 | (2006.01) | |
| F16M 11/00 | (2006.01) | |
| B25H 1/16 | (2006.01) | |
| B25H 1/02 | (2006.01) | |
| B25H 1/10 | (2006.01) | |
| G05B 19/423 | (2006.01) | |
| G05B 19/042 | (2006.01) | |

(52) U.S. Cl.
CPC .............. B25H 1/16 (2013.01); B25H 1/02 (2013.01); B25H 1/10 (2013.01); G05B 19/0423 (2013.01); G05B 19/423 (2013.01); G05B 2219/35491 (2013.01)

(58) Field of Classification Search
CPC .................................................. H01L 21/681
USPC .......................................................... 700/114
See application file for complete search history.

(56) References Cited

U.S. PATENT DOCUMENTS

| | | | | |
|---|---|---|---|---|
| 5,224,429 A * | 7/1993 | Borgman | ................. | A47B 9/00 108/147 |
| 5,706,739 A * | 1/1998 | Shaheen | ................. | A47B 9/02 108/146 |
| 6,286,441 B1 * | 9/2001 | Burdi | ....................... | A47B 9/00 108/147 |
| 6,502,809 B1 * | 1/2003 | Gionta | .................. | B25B 1/2478 269/154 |
| 6,546,880 B2 * | 4/2003 | Agee | ........................ | A47B 9/12 108/147 |
| 6,682,030 B2 * | 1/2004 | Santoro | ..................... | A47B 9/04 108/147 |
| 6,832,560 B2 * | 12/2004 | Seiler | ...................... | A47B 21/00 108/50.01 |
| 6,857,493 B2 * | 2/2005 | Shupp | ....................... | B60T 7/16 180/168 |
| 8,947,215 B2 * | 2/2015 | Mandel | ................. | G06Q 10/109 108/147 |

(Continued)

Primary Examiner — Suresh Suryawanshi
(74) Attorney, Agent, or Firm — Patterson + Sheridan, LLP

(57) ABSTRACT

A method, automated workstation, and computer system for automatically adjusting a workpiece to suit a particular operator is provided. An operator can be identified by scanning an identification badge, using facial recognition, or voice recognition. A physiological profile for the identified operator is then retrieved. A work station holding a workpiece is then automatically adjusted to set the workpiece at a height and/or orientation that is ergonomically beneficial for the operator.

16 Claims, 6 Drawing Sheets

(56) References Cited

U.S. PATENT DOCUMENTS

| | | | | |
|---|---|---|---|---|
| 9,039,016 B2* | 5/2015 | Abernethy | ................ | B62B 3/02 |
| | | | | 280/6.15 |
| 9,486,070 B2* | 11/2016 | Labrosse | ................ | A47B 21/02 |
| 2007/0228680 A1* | 10/2007 | Reppert | ................ | A47B 21/00 |
| | | | | 280/47.35 |
| 2016/0015167 A1* | 1/2016 | Abu-Akel | .............. | A47B 21/02 |
| | | | | 248/161 |

* cited by examiner

US 9,999,971 B2

ERGONOMIC AUTOMATED WORKSTATION

BACKGROUND

Aspects described herein relate to an automated work station, and more specifically, to workpiece holding fixtures that can rotate and translate to accommodate different physiologies of different operators.

SUMMARY

According to one aspect, a computer-implemented method includes receiving electronic data that identifies a first operator from among a plurality of operators. The method also includes retrieving at least one of first anatomical data and first physiological data for the identified first operator from a data structure. The method also includes automatically generating at least one control command to a workpiece holding fixture to adjust at least one of a height and an orientation of a workpiece in the workpiece holding fixture, based on the retrieved at least one of first anatomical data and first physiological data.

According to at least one aspect, an automated work station includes a workbench. The workbench includes an actuator operable to adjust a height of the workbench. The automated work station also includes a workpiece holding fixture arranged on the workbench. The workpiece holding fixture includes a first workpiece securing mechanism operable to releasably secure a first end of a workpiece and to rotate the secured workpiece about an axis. The workpiece holding fixture also includes a second workpiece securing mechanism arranged along the axis and spaced apart from the first workpiece securing mechanism. The second workpiece securing mechanism is operable to releasably secure a second end of the workpiece, opposite the first end, and to rotate the secured workpiece about the axis. At least one of the first workpiece securing mechanism and the second workpiece securing mechanism is moveable along the axis to accommodate different workpieces having different distances between the first end and the second end. The workpiece holding fixture also includes a drive mechanism operable to drive rotation of the end of the workpiece. The automated work station also includes an interface operable to receive command signals from a computer system. The actuator adjusts the height of the workbench in response to the interface receiving a first command signal. The drive mechanism adjusts a rotational orientation of the workpiece in response to the interface receiving a second command signal.

According to one aspect, a computer system for use with a fixture system having actuators includes a computer processor operable to receive an identification of a first operator. After receiving the identification, the computer processor is operable to retrieve at least one of first anatomical data and first physiological data for the first operator from among a plurality of operators. The computer processor is also operable to output a first control command to the actuator to adjust the height of the workbench, based on the retrieved at least one of first anatomical data and first physiological data. The computer processor is also operable to output a second control command to the drive mechanism to adjust a rotational orientation of the workpiece, based on the retrieved at least one of first anatomical data and first physiological data.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

When working with large workpieces, such as frame members or floor beams for use in commercial aircraft, work stations are often used that hold the workpiece and allow the workpiece to be reoriented for different tasks. Currently, work stations are manually adjusted to suit different human workers (referred to herein as "operators") and may only have limited adjustments. For example, a workpiece may be rotated about an axis, but only in ninety degree increments. Different operators often have different physiological characteristics. For example, a first operator may be taller than a second operator. As another example, a first operator may have a longer reach than a second operator. In various aspects discussed herein, a work station can be automatically adjusted, based on the particular operator using the station, to place the workpiece in a position and/or orientation that is ergonomically beneficial for the operator. As a result, the operator is less likely to experience fatigue while working on the workpiece.

Figure 1:
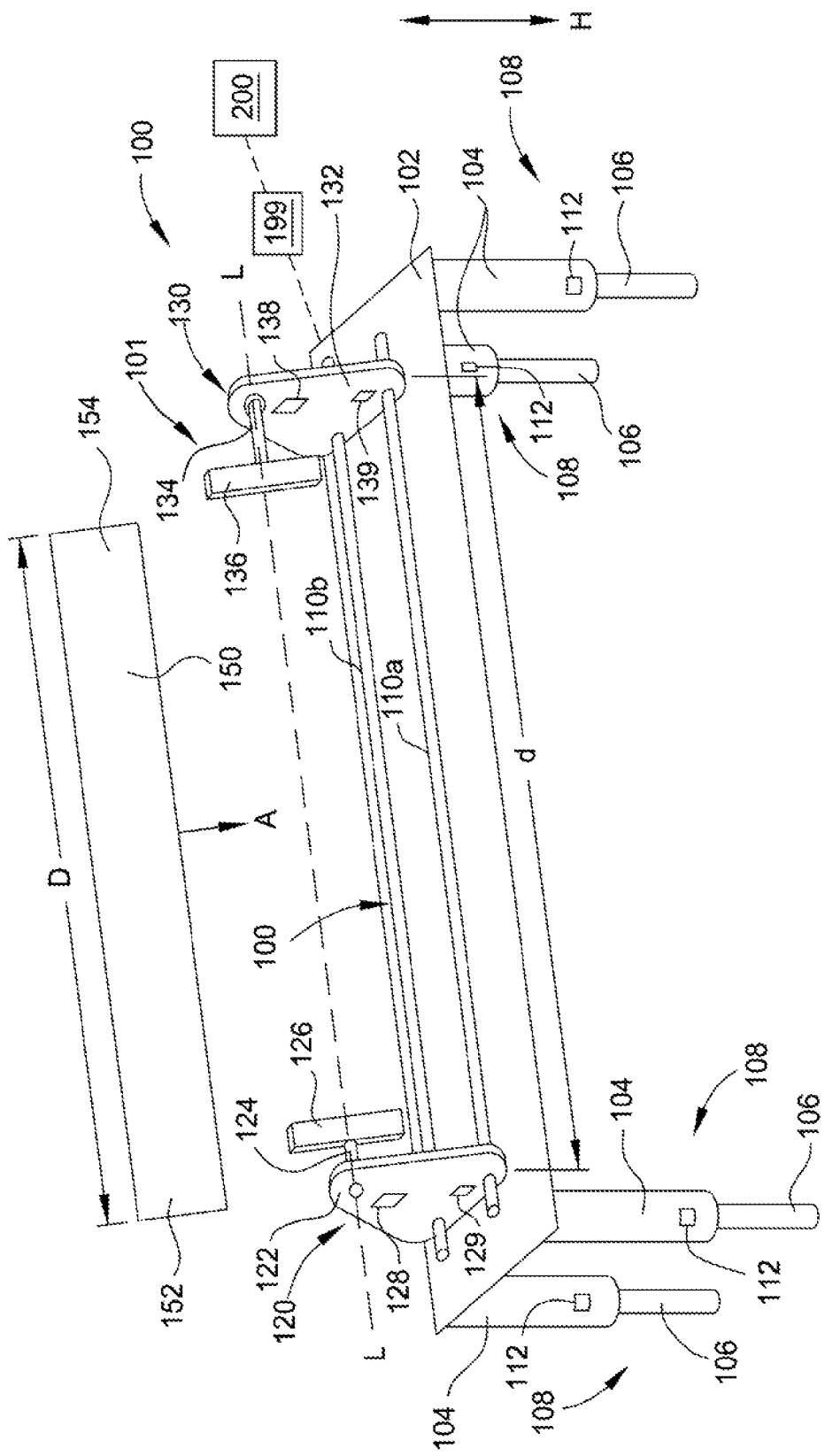
FIG. 1 is a perspective view of a work station for holding a workpiece.

FIG. 1 is a perspective view of a work station 100 with a workpiece 150 being arranged in a workpiece holding fixture 101. A computer system 200, illustrated in block diagram form, is connected to the work station 100 via an interface 199 and is discussed in greater detail below with reference to FIG. 4. The work station 100 includes a workbench 102 with a plurality of adjustable legs 108. The plurality of adjustable legs 108 include a fixed portion 104 attached to the workbench 102 and a telescoping portion 106 extending from the fixed portion 104. The telescoping portions 106 can be moved in and out with respect to the fixed portions 104 to change a height (indicated by arrow H) of the workbench 102.

The workbench 102 includes the workpiece holding fixture 101 arranged thereon. The workpiece holding fixture 101 includes a first workpiece securing mechanism 120 and a second workpiece securing mechanism 130. The first workpiece securing mechanism 120 and the second workpiece securing mechanism 130 are arranged on guide rails 110. Here, the first workpiece securing mechanism 120 and the second workpiece securing mechanism 130 are arranged on a first guide rail 110a and a second guide rail 110b (collectively referred to as the guiderails 110). The workpiece securing mechanisms 120 and/or 130 can slide along the guide rails 110 to adjust a distance d between the first workpiece securing mechanism 120 and the second workpiece securing mechanism 130. The first workpiece securing mechanism 120 includes a bracket 122 arranged on the guide rails 110. A spindle 124 extends from the bracket 122, and a first end effector 126 is attached to the spindle 124. The spindle 124 enables the first end effector 126 to rotate about a longitudinal axis L-L. The second workpiece securing mechanism 130 includes a bracket 132 arranged on the guide rails 110. A second spindle 134 extends from the bracket 132, and a second end effector 136 is attached to the second spindle 134. The second spindle 134 enables the second end effector 136 to rotate about the longitudinal axis L-L.

The first end effector 126 is adapted to releasably attach to a first end 152 of a workpiece 150 and the second end effector 136 is adapted to releasably attach to a second end 154 of a workpiece 150. For example, in various aspects, the first end effector 126 and/or the second end effector 136 could include clamps that can grip the respective ends 152 and 154 of a workpiece 150. In various other aspects, the first end effector 126 and/or the second end effector 136 could include pins, dowels, keyed features, or the like that match respective holes or keyed features on the respective ends 152 and 154 of a workpiece 150. In various aspects, the end effectors 126 and 136 can be removed and replaced with different end effectors to hold different types of workpieces. To arrange a workpiece 150 in the end effectors 126 and 136, the first workpiece securing mechanism 120 and/or the second workpiece securing mechanism 130 can be moved along the guide rails 110a and 110b to a distance d such that the end effectors 126 and 136 are properly positioned to attach to the respective ends 152 and 154 of a workpiece 150. The first workpiece securing mechanism 120 and/or the second workpiece securing mechanism 130 can then be secured to the guide rails 110 at the distance D. Thereafter, a workpiece 150 can be arranged in the end effectors 126 and 136. With a workpiece 150 arranged in the end effectors 126 and 136 of the workpiece holding fixture, a workpiece 150 can be rotated about the longitudinal axis L-L and the height of a workpiece 150 (and the workbench 102) in the direction of arrow H can be adjusted by adjusting the legs 108 of the workbench 102 to accommodate the unique physiological characteristics of different operators.

Figure 2:
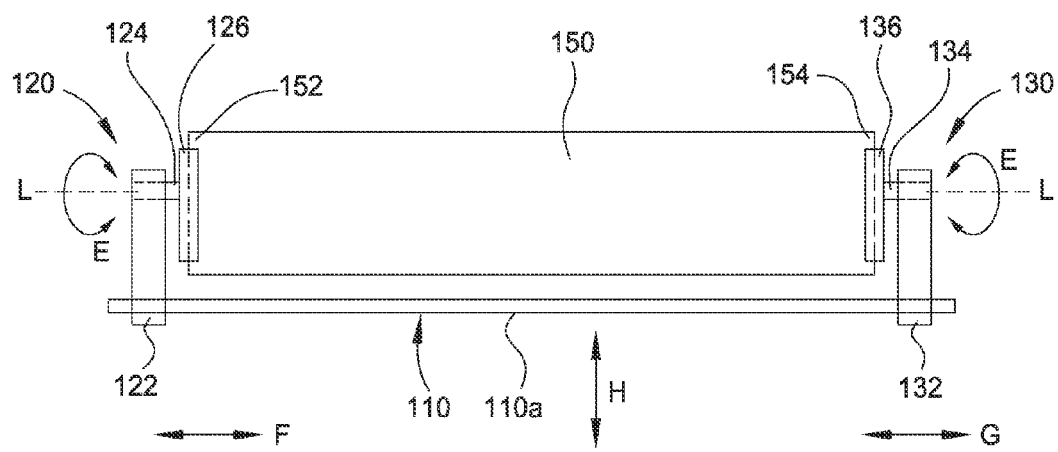
FIG. 2 is a side view of portions of the work station and the workpiece of FIG. 1.

FIG. 2 is a side view of portions of the work station 100 shown in FIG. 1. Specifically, FIG. 2 shows the guide rail 110a with the first workpiece securing mechanism 120 and the second workpiece securing mechanism 130 arranged thereon. As shown, the bracket 122 of the first workpiece securing mechanism 120 can be moved along the guide rails 110 in the direction of arrow F and/or the bracket 132 of the second workpiece securing mechanism 130 can be moved along the guide rails 110 in the direction of arrow G to change the distance between the respective end effectors 126 and 136. By moving the first workpiece securing mechanism 120 and/or the second workpiece securing mechanism 130 along the guide rails 110, the respective end effectors 126 and 136 can be moved a distance apart to accommodate a workpiece 150. When a workpiece 150 is secured in the end effectors 126 and 136, the workpiece 150 can be rotated about the longitudinal axis L-L on the spindles 124 and 134. In various aspects, the spindles 124 and 134 can be releasably locked such that the end effectors 126 and 136 and a workpiece 150 do not rotate about the longitudinal axis L-L.

Figure 3:
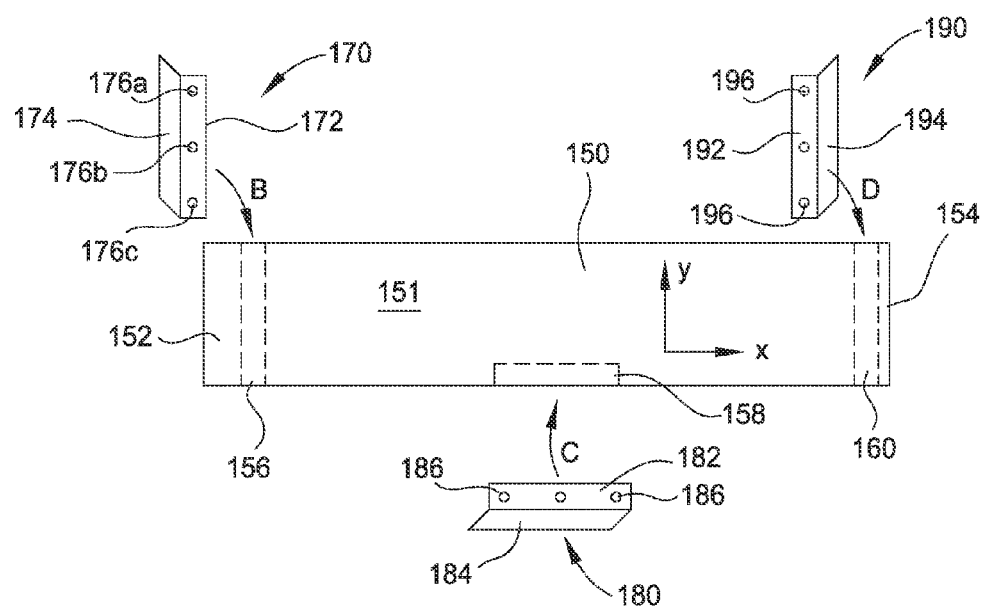
FIG. 3 is perspective exploded view of the workpiece of FIG. 1 with several brackets or other components for installation on the workpiece.

FIG. 3 illustrates the exemplary workpiece 150 with various brackets 170, 180, and 190 to be attached thereto shown in an exploded view. For example, an operator may attach a first bracket 170 at a location 156 (indicated by broken lines) on a workpiece 150. The first bracket 170 can include a first surface 172 that will abut a mounting surface 151 of a workpiece 150 and a second surface 174 that will extend away from a workpiece 150 after the first bracket 170 is installed on a workpiece 150. The first bracket 170 has three holes 176a, 176b, and 176c (collectively, holes 176) through which screws, rivets, or other fasteners are inserted to attach the first bracket 170 to a workpiece 150. The operator may drill holes through a workpiece 150 to match the holes 176 in the bracket 170 and may also insert the fasteners through the holes 176 in the bracket 170 and the workpiece 150 after arranging the bracket 170 on the workpiece 150 (as indicated by arrow B).

The operator may attach a second bracket 180 at the location 158 (indicated by broken lines) on the workpiece 150. The second bracket 180 can include a first surface 182 that will abut the mounting surface 151 of the workpiece 150 and a second surface 184 that will extend away from the workpiece 150 after the second bracket 180 is attached to the workpiece 150. The second bracket 180 has three holes 186 through which screws, rivets, or other fasteners are inserted to attach the second bracket 180 to a workpiece 150. The operator may drill holes through a workpiece 150 to match the holes 186 and the bracket 180 and insert the fasteners through the holes 186 of the bracket 180 and a workpiece 150 after arranging the bracket 180 on a workpiece 150 (as indicated by arrow C).

The operator may attach a third bracket 190 at the location 160 (indicated by broken lines) on the workpiece 150. The third bracket 190 can include a first surface 192 that will abut the mounting surface 151 of the workpiece 150 and the second surface 194 that will extend away from the workpiece 150 after the third bracket 190 is attached to the workpiece 150. The third bracket 190 has three holes 196 through which screws, rivets, or other fasteners are inserted to attach the third bracket 190 to a workpiece 150. The operator may drill holes through the workpiece 150 to match the holes 196 in the bracket 190 and insert the fasteners through the holes 196 of the bracket 190 and the workpiece 150 after arranging the bracket 190 on the workpiece 150 (as indicated by arrow D).

The brackets 170, 180, and 190 are merely illustrative of operations an operator may perform on a workpiece 150. In complex pieces, such as a frame member for a floor in an aircraft, the operator may install many different features on a workpiece 150 at various locations along the length (indicated by axis x) and along the width (indicated by axis y) of the workpiece 150. It can be appreciated that the operator could have an optimal or preferred posture while installing each of the various features onto a workpiece 150, and that the optimal or preferred posture for one operator may differ from that of a second operator (e.g., based on differences in height or other anatomical or physiological aspects). It can also be appreciated that the operator may want to adjust his body position to apply the various features at different locations on a workpiece 150 if the workpiece 150 is in a fixed position within the work station 100 shown in FIG. 1.

Figure 4:
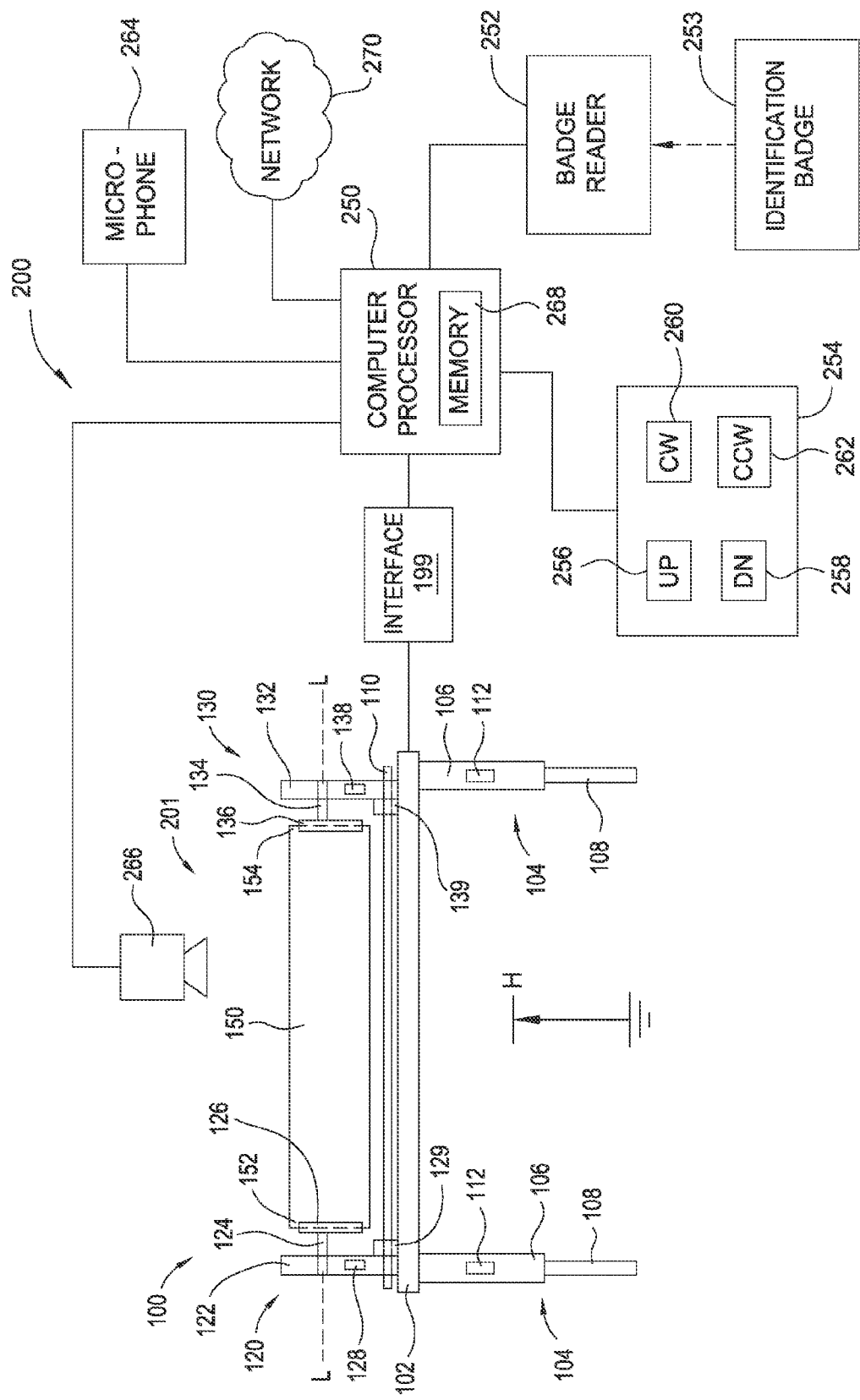
FIG. 4 is a side view of a work station for holding a workpiece and a block diagram of components supporting functions of the work station according to at least one aspect.

FIG. 4 illustrates a front view of the work station 100 and a block diagram of a computer system 200 in communication with the work station 100 via an interface 199 according to at least one aspect. The work station 100 includes the workbench 102 supported by the plurality of legs 104. Each of the legs 104 include the fixed portion 106 connected to the workbench 102 and the telescoping portion 108 extending from the fixed portions 106. Each of the legs 104 also includes an actuator 112 that can automatically extend or retract the telescoping portions 108 to change a height H of the workbench 102 (and a workpiece 150 held by the end effectors 126 and 136) in response to a control command signal, discussed in greater detail below. The actuators 112 could include linear encoders or a like device that report the positions of the actuators 112 and/or the telescoping portions 108 of the legs 104 relative to the fixed portions 106. The guide rails 110 are arranged on the workbench 102. The work station 100 includes a workpiece holding fixture 201 arranged thereon. The workpiece holding fixture 201 includes the first workpiece securing mechanism 120 and the second workpiece securing mechanism 130, which are arranged on the workbench 102 and the guide rails 110.

The first workpiece securing mechanism 120 includes the first bracket 122 arranged on the guide rails 110. The spindle 124 extends from the first bracket 122, and the first end effector 126 is attached to the spindle 124. The first workpiece securing mechanism 120 can include an actuator 128 that can drive rotation of the spindle 124 and the first end effector 126 to a particular rotational orientation in response to a control command signal. The actuator 128 could include a rotary encoder or a like device that reports a rotational orientation of the spindle 124. The first workpiece securing mechanism 120 can also include an actuator 129 that can move the bracket 122 along the guide rails 110 and/or lock the bracket 122 to the guide rails 110 in response to a control command signal. The actuator 129 could include a linear encoder or a like device that reports a position of the actuator 129 and/or the bracket 122 relative to the longitudinal position on the guide rails 110.

The second workpiece securing mechanism 130 includes the second bracket 132 arranged on the guide rails 110. The spindle 134 extends from the second bracket 132, and the second end effector 136 is attached to the spindle 134. The second workpiece securing mechanism 130 can include an actuator 138 that can drive rotation of the spindle 134 and second end effector 136 to a particular rotational orientation in response to a control command signal. The actuator 138 could include a rotary encoder or a like device that reports a rotational orientation of the spindle 134. The first workpiece securing mechanism 120 can also include an actuator 139 that can move the bracket 132 along the guide rails 110 and/or lock the bracket 132 to the guide rails 110 in response to a control command signal. The actuator 139 could include a linear encoder or the like that reports a position of the actuator 139 and/or the bracket 132 relative to the longitudinal position on the guide rails 110. As shown in FIG. 4, a workpiece 150 is arranged in the work station 100, wherein a first end 152 of a workpiece 150 is releasably engaged with the first end effector 126 of the first workpiece securing mechanism 120 and a second end 154 of a workpiece 150 is releasably engaged with the second end effector 136 of the second workpiece securing mechanism 130.

The work station 100 includes a computer processor 250 in communication with the various actuators 112, 128, 129, 138, and 139. The computer processor 250 can send control command signals to the various actuators 112, 128, 129, 138, and 139 to control a height H of the workbench 102 (and a workpiece 150) above the ground, to control a distance between the first workpiece securing mechanism 120 and the second workpiece securing mechanism 130, and to control the rotational orientation of the end effectors 126 and 136 (and the workpiece 150 therebetween). The computer processor 250 can include and/or be in communication with computer memory 268.

In various aspects, the computer processor 250 is in communication with a badge reader 252. The badge reader 252 could read a magnetic stripe on an identification badge 253, could read an RFID chip on an identification badge, could read a barcode, QR code, or the like on an identification badge 253, card, memory, or other object, or perform other electronic recognition on an identification badge 253. In such aspects, an operator who is preparing to work on a workpiece 150 in the work station 100 could swipe or otherwise scan his identification badge 253 using the badge reader 252. The identification badge 253 could transmit to the badge reader 252 identification information about the operator, such as a name and/or employee identification number. The identification information could be transmitted from the badge reader 252 to the computer processor 250, and the computer processor 250 could retrieve from the memory 268 anatomical and/or physiological data related to the operator. For example, the anatomical and/or physiological data could include, for example, a height of the operator. The height information could then be used to adjust the height H of the workbench 102 (and the workpiece 150) and/or the rotational orientation of the end effectors 126 and 136 (and the workpiece 150).

Specifically, the computer processor 250 could output control command signals to the actuators 112 in the legs 104 to adjust the height H of the workbench 102 (and thereby adjust the height of a workpiece 150) and/or output control command signals to the actuators 128 and 138 in the first and second workpiece securing mechanisms 120 and 130, respectively, to adjust the rotational orientation of the end effectors (and the workpiece 150). The computer processor 250 could receive signals from linear encoders associated with the actuators 112 in the legs 104 to determine the height H of the workbench 102. The computer processor 250 could also receive signals from rotary encoders associated with the actuators 128 and 138 in the first and second workpiece securing mechanisms 120 and 130, respectively, to determine the rotational orientation of a workpiece 150. The signals from the encoders could be used as feedback by the computer processor 250 to control the actuators 112, 128, and 138. As another example, the anatomical and/or physiological data could include an ergonomic profile for the operator that includes a proper height H of the workbench 102 (to set the workpiece 150 at a proper height) and/or an appropriate rotational orientation of the end effectors 126 and 136 (and the workpiece 150).

In another aspect, the identification badge could include and transmit to the badge reader 252 the anatomical and/or physiological data and/or the ergonomic profile for the operator. For example, the identification badge could store the operator's height and/or could store the proper height H of the workbench 102 (and a workpiece 150) and/or the appropriate rotational orientation of the end effectors 126 and 136 (and the workpiece 150) for that operator. The anatomical and/or physiological data and/or the ergonomic profile for the operator could be transmitted by the badge reader 252 to the computer processor 250, and the computer processor 250 can output appropriate control command signals to the actuators 112, 128, 129, 138, and 139.

In various aspects, the computer processor 250 could identify the operator without using the badge reader 252. For example, in various aspects, the computer processor 250 could be in communication with a digital camera 266 or other sensor that could obtain an image of the operator. The computer processor 250 could then apply facial recognition technology or retina-based identification to the obtained image of the operator to identify the operator. Anatomical and/or physiological data and/or an ergonomic profile for the identified operator could then be retrieved from the memory 268. In various aspects, the digital camera 266 or other sensor could be used to analyze the anatomical and/or physiological characteristics of an operator and to adjust the work station 100 based on the analyzed anatomical and/or physiological characteristics. For example, the computer processor 250 could assess a height of an operator at the work station 100 from an image of the operator obtained by the digital camera 266, and could output control command signals to adjust the height H of the workbench 102 (and a workpiece 150) (using the actuators 112 in the legs 104) to an appropriate ergonomic height for a person having the height of that operator. Such an anatomical and/or physiological assessment could be performed in addition to and/or as an alternative to facial recognition.

As another example of identifying the operator without using the badge reader 252, a microphone 264 or other acoustic transducer could obtain a sample of an operator's voice. The computer processor 250 could compare the obtained sample to voice profiles of different operators to identify the operator based on the voice. The computer processor 250 could then retrieve anatomical and/or physiological data and/or an ergonomic profile for the identified operator from the memory 268.

As another example of identifying the operator without using the badge reader 252, the operator could enter employee identification information into an input module 254. For example, the input module 254 could be a keyboard or touchscreen display, and the user could enter name, employee number, social security number, or the like using the input module 254. The input module could transmit the employee identification information to the computer processor 250, which could retrieve from the memory 268 the identification of the employee and/or the anatomical and/or physiological data and/or ergonomic profile data for the operator.

In one aspect, anatomical and/or physiological data and/or the ergonomic profiles for operators could be stored on a computer network 270. In such aspects, when a particular operator scans a badge using the badge reader 252, the badge reader 252 could transmit identification information to the computer processor 250, and the computer processor 250 could transmit a query to the computer network 270. In response to the query, the computer network 270 could retrieve and transmit to the computer processor 250 the anatomical and/or physiological data and/or the ergonomic profile for the particular operator.

In the above-described aspects, the anatomical and/or physiological data and/or the ergonomic profile for different operators could be provided to different work stations. For example, as the operator moves from a first work station to a second work station, the anatomical and/or physiological data and/or the ergonomic profile for the operator can be transmitted to the first station and then the second station by the operator's identification badge. Alternatively, operator moves from a first work station to a second work station, the anatomical and/or physiological data and/or the ergonomic profile for the operator can be transmitted to the first station and then the second station by the computer network after the operator scans his identification badge or is otherwise recognized.

Regardless of the manner of identification, once a particular operator has been identified and/or an appropriate set up of the work station 100 for the particular operator has been determined, the computer processor 250 can output control command signals to the various actuators 112, 128, 129, 138, and 139 to adjust the height and rotational orientation of a workpiece 150. For example, the computer processor 250 could output a first control command signal to the actuators 112 in the legs 104 of the workbench 102 to adjust the height H of the workbench 102 with respect to the floor (and thereby adjust the height of the workpiece 150). The computer processor 250 could also output control command signals to the actuators 128 and/or 138 in the first workpiece securing mechanism 120 and the second workpiece securing mechanism 130, respectively, to control the rotational orientation of the end effectors 126 and 136 (and the workpiece 150). As discussed above, the actuators could be associated with encoders that output position signals to the computer processor 250. The computer processor 250 can use the output position signals to determine when the workbench 102 has reached a target height H (e.g., to position the workpiece 150 at an ergonomically beneficial height) and/or when the end effectors 126 and 136 (and the workpiece 150) have achieved a target orientation. Once the target height and/or target orientation has been reached, the computer processor 250 can terminate the control command signals.

In various instances, the operator may install a workpiece 150 in the work station 100. Put differently, the operator may position and secure the workpiece in the end effectors 126 and 136 of the work station 100. In various aspects, the computer processor 250 could determine what workpiece the operator is going to be working on. For example, the operator's identification badge could include a task list for the operator that identifies the workpiece or workpieces that the operator may work on. Such information could be transmitted to the computer processor 250 when the operator's identification badge is read by the badge reader 252. As another example, the computer network 270 that could include such a task list. In such aspects, the computer processor 250 could send control command signals to the actuators 129 and 139 to move the brackets 122 and 132 such that the end effectors 126 and 136 are properly spaced apart for the next workpiece to be worked on by the operator. As discussed above, the actuators 129 and 139 could be associated with linear encoders that report position information to the computer processor 250. The computer processor 250 could terminate the control command signals to the actuators 129 and 139 when the reported positions are equal to target positions.

In various instances, an operator may want to adjust the height H of the workbench 102 (e.g., to adjust the height of the workpiece 150 to an ergonomically beneficial height) and/or the rotational orientation of the end effectors 126 and 136 (and the workpiece 150) using manual inputs. The work station 100 could include the input module 254 that enables the operator to input manual control commands. The input module 254 could include physical buttons, switches, knobs, or the like that the operator could manipulate to adjust the height of the workbench 102 (and a workpiece 150) and/or rotational orientation of the end effectors 126 and 136 (and the workpiece 150). The input module 254 could include a touchscreen display with displays icons for the operator to press to adjust the height of the workbench 102 (and the workpiece 150) and/or rotational orientation of the end effectors (and the workpiece 150). In the exemplary aspect shown in FIG. 4, the input module 254 includes a first input selector 256 to move the workbench 102 up (i.e., to increase the height H of the workbench 102 (and a workpiece 150)), a second input selector 258 to move the workbench 102 down (i.e., to decrease the height H of the workbench 102 (and a workpiece 150)), a third input selector 260 to rotate the end effectors 126 and 136 (and the workpiece 150) in a clockwise direction, and a fourth input selector 262 to rotate the end effectors 126 and 136 (and the workpiece 150) in a counterclockwise direction. In the event that the operator engages the input selectors 256, 258, 260, and 262, a manually-input control command signal is sent to the computer processor 250, and the computer processor 250 transmits control command signals to the appropriate actuators 112, 128, 129, 138, and 139. In various aspects, the input module 254 could be directly in communication with the various actuators 112, 128, 129, 138, and 139 such that the manually-input control command signals are sent directly to the actuators 112, 128, 129, 138, and 139.

In various aspects, if a particular operator manually inputs adjustments to the position of the work station 100, the anatomical and/or physiological data associated with that operator could be adjusted. For example, if an operator increases the height H of the workbench 102 by one inch (2.54 cm) after the actuators 112 have adjusted the height H of the workbench 102 (and a workpiece 150) based on the anatomical and/or physiological data for that operator, then the anatomical and/or physiological and/or ergonomic profile data for the operator could be revised so that the height H of the workbench 102 (and the workpiece 150) is one inch (2.54 cm) higher. In various aspects, the particular operator could be prompted to indicate whether the manually-input adjustments should be incorporated into the anatomical and/or physiological data and/or ergonomic profile for the operator.

Figure 5:
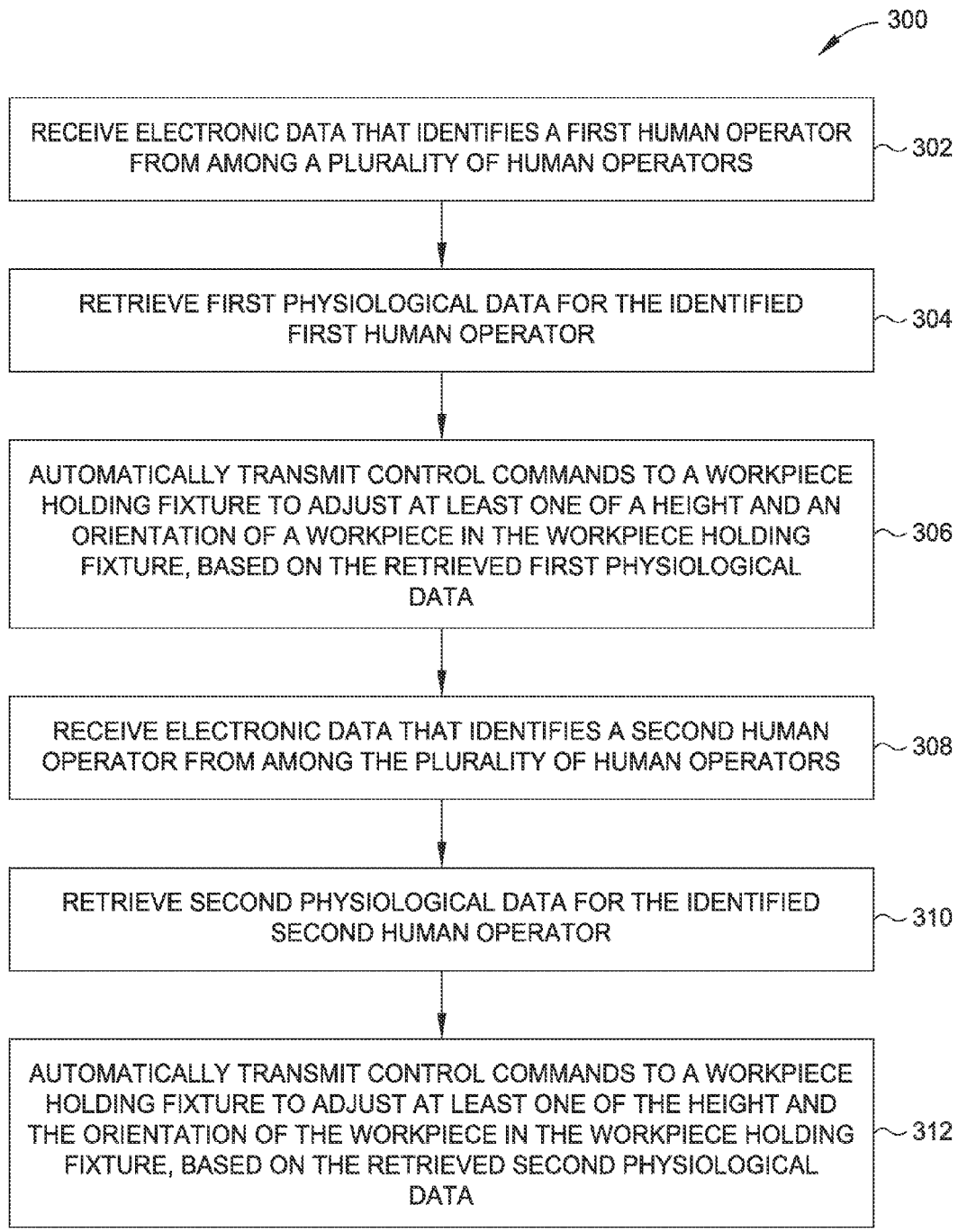
FIG. 5 is a flow chart of a method for automatically adjusting a work station for holding a workpiece for a first operator and then a second operator.

FIG. 5 is a flowchart for a method 300 for operating the work station 100 illustrated in FIG. 4. In block 302, electronic data that identifies a first operator from among a plurality of operators is received at the computer processor 250. As discussed above, the electronic data could be received from a badge reader 252, a digital camera 266, or a microphone 264, or other suitable device. The electronic data could also be manually entered. In block 304, first anatomical and/or physiological data for the identified first operator is retrieved. As discussed above, the anatomical and/or physiological data could be retrieved from computer memory 268, could be retrieved from an identification badge for the operator, or could be assessed from a digital image of the operator obtained by digital camera 266. In block 306, control commands are automatically generated to adjust at least one of a height and an orientation of a workpiece 150 in the workpiece holding fixture 201 based on the retrieved first anatomical and/or physiological data. As discussed above, the computer processor 250 could operate actuators 112 in the legs 104 of the workbench 102 to adjust the height H of the workbench 102 (and thereby adjust the height of the workpiece 150) and could operate actuators 128 and/or 138 in the first workpiece securing mechanism 120 and/or the second workpiece securing mechanism 130, respectively, to adjust the rotational orientation of the respective end effectors 126 and 136 (and the workpiece 150).

In various instances, the first operator may not complete all tasks on a workpiece 150 before the end of a work shift. In such instances, a second operator may be assigned to continue the tasks on the workpiece 150 on a subsequent shift. Still referring to the method 300, in block 308, electronic data that identifies the second operator from among the plurality of operators can be received at the computer processor 250. For example, the electronic data could be received when the second operator scans his badge at the badge reader 252, has his image obtained by the digital camera 266, or speaks into the microphone 264. In block 310, second anatomical and/or physiological data for the second operator is retrieved, for example, from memory 268. In block 312, control commands can be automatically generated and transmitted to the workpiece holding fixture 201 to adjust the height H of the workbench 102 (i.e., to adjust a height of the workpiece 150) and/or a rotational orientation of the end effectors 126 and 136 (and the workpiece 150) in the workpiece holding fixture 201 based on the retrieved second anatomical and/or physiological data. As discussed above, the computer processor 250 could operate actuators 112 in the legs 104 of the workbench 102 to adjust the height H of the workbench 102 (and the workpiece 150) and/or could operate actuators 128 and/or 138 in the first workpiece securing mechanism 120 and/or the second workpiece securing mechanism 130, respectively, to adjust the rotational orientation of the respective end effectors 126 and 136 (and the workpiece 150) to arrange the work station 100 to an ergonomically beneficial position for the second operator. As discussed below in greater detail below, after the work station 100 is adjusted to an ergonomically beneficial position, the work station 100 could be adjusted thereafter in accordance with manually input adjustments from the operator and/or in accordance with the requirements of a particular task (e.g., installing a particular fastener).

Referring again to FIG. 3, the operator may be working on different locations of a workpiece 150, and each task at each location may have a different optimal height and/or rotational orientation for the workpiece. For example, the first bracket 170 being installed on a workpiece 150 shown in FIG. 1 includes three holes 176 used to attach the bracket 170 to a workpiece 150. If a workpiece 150 was oriented such that a mounting surface 151 of a workpiece 150 is oriented vertically, then the optimal height above the ground of the workpiece 150 for installing a fastener through one of the three holes 176 could be different than the optimal height above the ground for the workpiece 150 for installing a fastener through the remaining holes 176. Referring again to FIG. 4, the camera 266 could be used to monitor the operator's progress such that when the operator completes a first task, the computer processor 250 automatically adjusts the height H of the workbench 102 (and the workpiece 150) and/or rotational orientation of the end effectors 126 and 136 (and the workpiece 150) for a second task. In various aspects, each operator could have options or preferences for how he likes the workpiece to be positioned. For example, there could be a first option for vertical positioning and a second option for rotational orientation of the workpiece.

Figure 6:
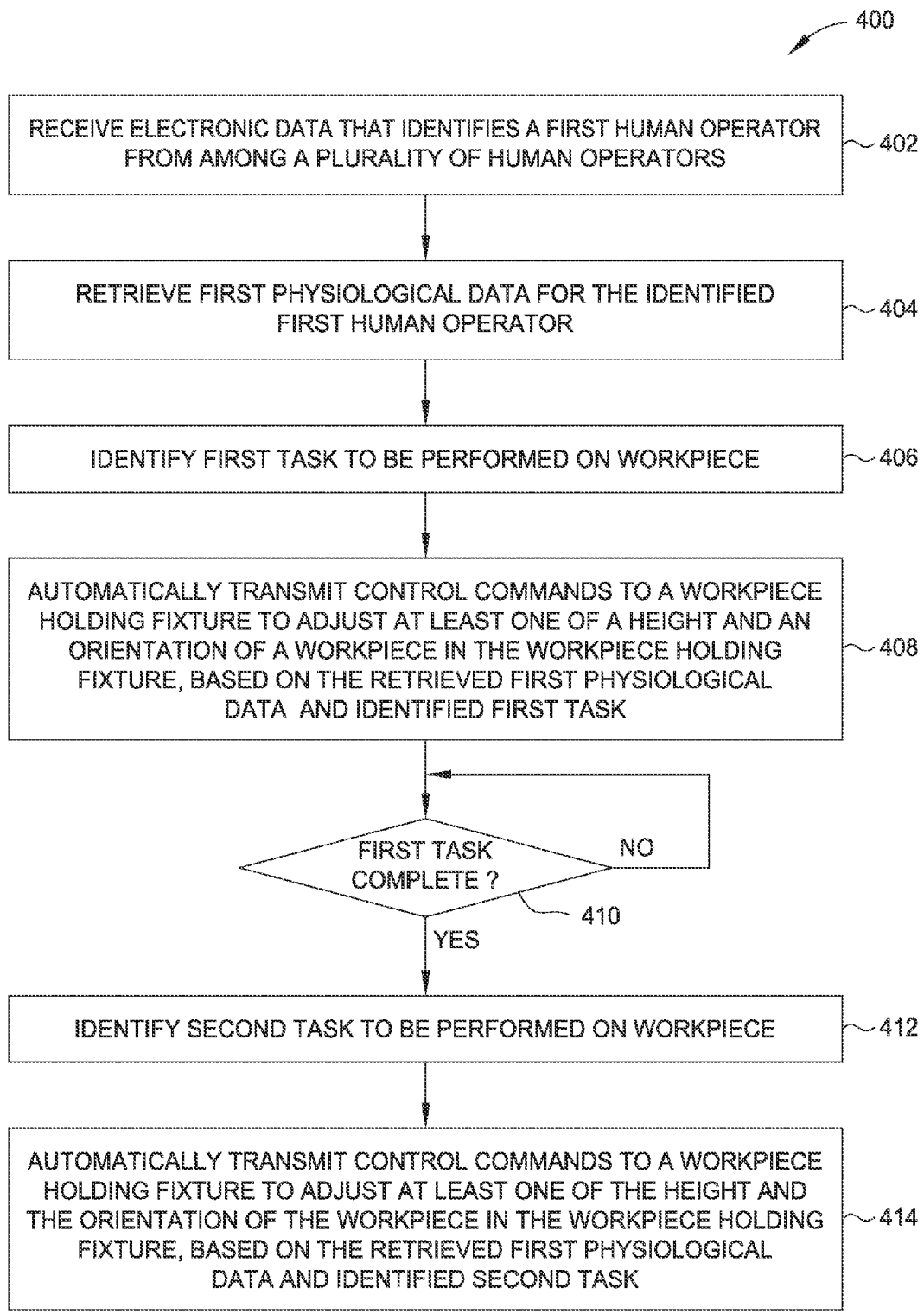
FIG. 6 is a flow chart of a method for automatically adjusting a work station for holding a workpiece for a first task and then for a second task.

FIG. 6 is a flowchart for a method 400 for operating the work station 100 (shown in FIG. 4) in a manner such that the workbench 102 (and a workpiece 150) is adjusted to a different height H above the ground and/or the end effectors 126 and 136 (and the workpiece 150) are adjusted to a different rotational orientation for different tasks. In block 402 of the method 400, electronic data that identifies a first operator from among the plurality of operators is received at the computer processor 250. For example, the electronic data could be received when the first operator scans a badge 253 at the badge reader 252, has an image obtained by the digital camera 266, or speaks into the microphone 264. In block 404, first anatomical and/or physiological data for the identified first operator is retrieved. As discussed above, the anatomical and/or physiological data could be retrieved from computer memory 268, could be retrieved from an identification badge for the operator, or could be assessed from a digital image of the operator obtained by digital camera 266. For example, the anatomical and/or physiological data could be assessed by estimating a height of the operator from the digital image.

In block 406, a first task to be performed on a workpiece 150 is identified. For example, the computer processor 250 could retrieve from memory 268 or from the network 270 a workflow and/or instructions for operations on the workpiece 150. The workflow and/or instructions could identify the tasks to be performed on the workpiece 150 and/or an order in which the tasks are to be performed. For example, with reference to FIG. 3, the workflow and/or instructions may call for the operator to first install a fastener through hole 176a in the bracket 170 and then a second fastener through hole 176c in the bracket 170.

In block 408, control commands are automatically generated and transmitted to the workpiece holding fixture to adjust at least one of the height of the workbench 102 (and the workpiece 150) and/or an orientation of the end effectors 126 and 136 (and the workpiece 150) based on the retrieved first anatomical and/or physiological data for the operator and the identified first task to be performed. For example, the computer processor 250 could send control commands to the actuators 112 for the legs 104 of the workbench 102 and the actuators 128 and 138 for the first and second workpiece holding fixtures 120 and 130, respectively, to adjust the height H of the workbench 102 (and the workpiece 150) and/or rotational orientation of the end effectors 126 and 136 (and the workpiece 150) to a suitable height and/or rotational orientation for the operator to install a fastener through the hole 176a in the bracket 170.

In block 410, the computer processor 250 can check to determine whether the first task is complete. For example, the computer processor 250 could analyze digital images obtained by the digital camera 266 to determine whether the fastener has been installed in the hole 176a. If the first task has not been completed, then the method 400 repeats block 410. After the first task has been completed, a second task to be performed on the workpiece 150 is identified in block 412. Continuing the example above, the second task may be installing a fastener through the hole 176c on the bracket 170. In block 414, control commands are automatically generated and transmitted to the workpiece holding fixture 201 to adjust at least one of the height H of the workbench 102 (and the workpiece 150) and/or the orientation of the end effectors 126 and 136 (and the workpiece 150) in the workpiece holding fixture 201 based on the retrieved first anatomical and/or physiological data for the operator and the identified second task to be performed. For example, the computer processor 250 could send control commands to the actuators 112 for the legs 104 of the workbench 102 and the actuators 128 and 138 for the first and second workpiece holding fixtures 120 and 130, respectively, to adjust the height and/or rotational orientation of the workpiece 150 to a suitable height and/or rotational orientation for the operator to install a fastener through the hole 176c in the bracket 170. The method 400 can continue for additional tasks to be performed on the workpiece 150.

Figure 7:
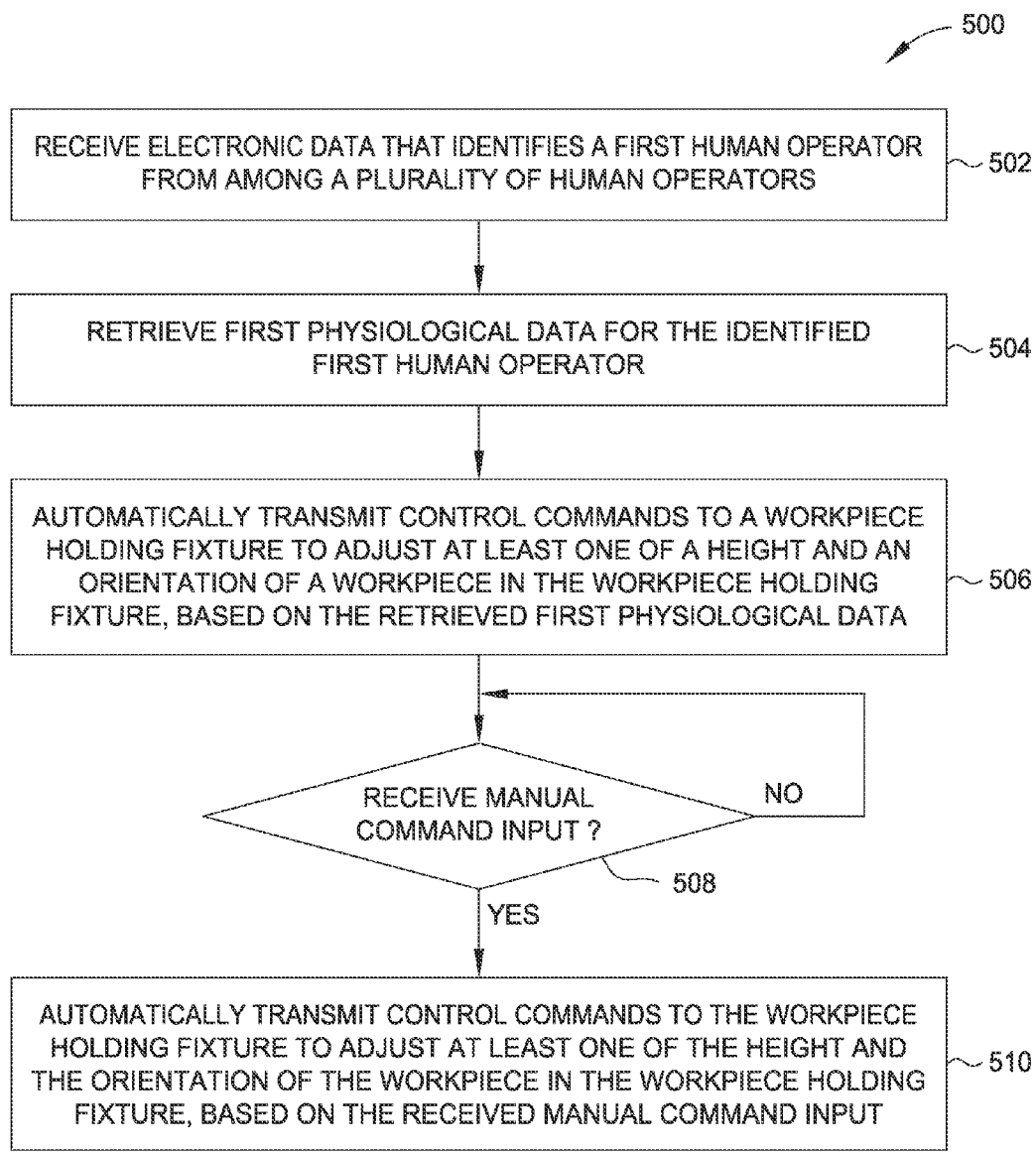
FIG. 7 is a flow chart of a method for automatically adjusting a work station for holding a workpiece for a first operator and then adjusting the work station based on manual command inputs.

FIG. 7 is a flowchart for a method 500 for operating a work station, such as the work station 100 shown in FIG. 4, according to at least one aspect. In block 502, electronic data that identifies a first operator from among a plurality of operators is received at the computer processor 250. For example, the electronic data could be received when the first operator scans a badge at the badge reader 252, has an image obtained by the digital camera 266, or speaks into the microphone 264. In block 504, first anatomical and/or physiological data for the identified first operator is retrieved. As discussed above, the anatomical and/or physiological data could be retrieved from computer memory 268, could be retrieved from an identification badge 253 for the operator, or could be assessed from a digital image of the operator obtained by digital camera 266. In block 506, control commands are automatically transmitted to the workpiece holding fixture 201 to adjust at least one of a height H of the workbench 102 (and the workpiece 150) and an orientation of the end effectors 126 and 136 (and the workpiece 150) in the workpiece holding fixture 201 based on the retrieved first anatomical and/or physiological data.

As discussed above, the computer processor 250 could operate actuators 112 in the legs 104 of the workbench 102 to adjust the height H of the workbench 102 (and the workpiece 150) and could operate actuators 128 and/or 138 in the first workpiece securing mechanism 120 and/or the second workpiece securing mechanism 130, respectively, to adjust the rotational orientation of the respective end effectors 126 and 136 (and the workpiece 150). In block 508, the method can determine whether a manually-selected command input has been received at the input module 254. For example, an operator could manually enter a command to the input module 254. If no manually-selected command input has been received, then the method 500 can loop back to repeat block 508. In the event that a manually-selected command input is received in block 508, then, in block 510, control commands are automatically generated and transmitted to the workpiece holding fixture 201 to adjust at least one of the height H of the workbench (and the workpiece 150) and/or the orientation of the end effectors 126 and 136 (and the workpiece 150) in the workpiece holding fixture 201 based on the received manually-selected command input. For example, the input module 254 could send a manually-selected control command signal to the computer processor 250, and the computer processor 250 could send control commands signals to the various actuators 112, 128, 129, 138, and 139 to adjust the height H of the workbench 102 (and the workpiece 150) and/or the rotational orientation of the end effectors 126 and 136 (and the workpiece 150).

The methods 300, 400, and 500 in FIGS. 5-7 could be implemented in parallel and/or in series. For example, the method 400 illustrated in FIG. 6 to automatically adjust a height H of the workbench 102 (and a workpiece 150) and/or the rotational orientation of the end effectors 126 and 136 (and the workpiece 150) for different tasks could be implemented at the same time as the method 300 in FIG. 5 to automatically adjust the workpiece 150 for different operators. For example, the portions of the method 300 described with reference to blocks 302-306 could be implemented to adjust the height H of the workbench 102 (and a workpiece 150) and/or rotational orientation of the end effectors 126 and 136 (and the workpiece 150) for a first operator. Thereafter, as the first operator completes tasks on the workpiece 150, the method 400 in FIG. 6 could be implemented to adjust the height H of the workbench 102 (and the workpiece 150) and/or rotational orientation of the end effectors 126 and 136 (and the workpiece 150) as a first operator completes tasks on the workpiece 150 and is ready to perform additional tasks. Also, the method 500 in FIG. 7 could be implemented to adjust the height H of the workbench 102 (and the workpiece 150) and/or rotational orientation of the end effectors 126 and 136 (and the workpiece 150) in response to manually-selected command inputs from the first operator. If a second operator replaces the first operator, the portions of the method 300 described with reference to blocks 308-312 could be implemented to adjust the height H of the workbench 102 (and the workpiece 150) and/or rotational orientation of the end effectors 126 and 136 (and the workpiece 150) for the second operator. Thereafter, as the second operator completes tasks on the workpiece 150, the method 400 could be implemented to adjust the height H of the workbench 102 (and the workpiece 150) and/or rotational orientation of the end effectors 126 and 136 (and the workpiece 150) as the second operator completes tasks on the workpiece 150 and is ready to perform additional tasks. Also, the method 500 could be implemented to adjust the height H of the workbench 102 (and the workpiece 150) and/or rotational orientation of the end effectors 126 and 136 (and the workpiece 150) in response to manually-selected command inputs from the second operator.

With reference to FIG. 4, a first operator may be assigned to the work station 100 for a particular work shift. Furthermore, the first operator may be assigned to work on a first type of workpiece 150 using the work station 100. When the first operator is at the work station 100, the first operator can provide identification using the badge reader 252 and/or providing other employee identification through the input module 254. Also, the first operator can be recognized by the work station 100 by the digital camera 266 and/or the microphone 264. After the computer 250 has identified the first operator, the computer processor 250 can identify the type of workpiece 150 to be worked on by the first operator. For example, the computer processor 250 could access the computer network 270 to identify a task list or the like for the first operator. The computer processor 250 can output control commands to operate the actuators 112 of the legs 104 of the workbench 102 to adjust the height H of the workbench 102. The computer processor 250 could also output control commands to operate the actuators 129 and/or 139 of the first and/or second workpiece securing mechanisms 120 and 130 so that the end effectors 126 and 136, respectively, are properly spaced apart for the identified type of workpiece 150.

Also, the computer processor 250 could output control commands to operate the actuators 128 and 138 in the brackets 122 and 132, respectively, to move the end effectors 126 and 136 to a rotational orientation that facilitates installation of the workpiece 150 in the work station 100. For example, the workpiece 150 could be lowered onto the work station 100 via an overhead crane, and the workpiece 150 may be suspended from the crane at a particular angle. The end effectors 126 and 136 could be rotated to a rotational orientation matches the particular angle of the workpiece 150 suspended from the crane. After the first operator has installed a workpiece 150 in the end effectors 126 and 136, the computer processor 250 can output control commands to operate the actuators 128 and 138 of the brackets 122 and 132 so that the workpiece 150 is rotationally oriented to an ergonomically beneficial position for the first operator. For example, the actuators 128 and 138 could move the workpiece 150 to an ergonomically beneficial position for a first task to be performed by the first operator on the workpiece 150.

The computer processor 250 can monitor completion of tasks on the workpiece 150 using the camera 266 or by user input on the input module 254 (i.e., the first operator could indicate completion of particular task using the input module 254), for example. When the first operator completes the first task, the computer processor 250 could receive an indication of the completed task. For example, if the task is installing a fastener in a hole 176a in a bracket, the indication that the task is complete could be an image of a fastener head at the location of the hole 176a in a digital image obtained by the digital camera 266 and transmitted to the computer processor 250.

Upon receiving the indication, the computer processor 250 can output control commands to the actuators 112 in the legs 104 and the actuators 128 and 138 of the brackets 122 and 132, respectively, to change the height H of the workbench 102 (and workpiece 150) and/or rotational orientation of the end effectors 126 and 136 (and the workpiece 150) to an ergonomically beneficial position for a second task. For example, the second task may be related to a location on the first workpiece 150 that is lower than a location for the first task. To prevent the first operator from bending over to reach the lower position, the computer processor 250 could output control commands to the actuators 112 in the legs 104 to increase the height H of the workbench 102 (and the workpiece 150) and could output control commands to the actuators 128 and 138 in the brackets 122 and 132, respectively, to adjust the rotational orientation of the end effectors 126 and 136 (and the workpiece 150). As a result, the first operator can remain in substantially the same ergonomically beneficial position to accomplish the first task and the second task. The computer processor 250 can continue to adjust the height H of the workbench 102 (and the workpiece 150) and/or rotational orientation of the end effectors 126 and 136 (and the workpiece 150) for subsequent tasks until work on the workpiece 150 is complete. Throughout the work on the first workpiece 150, the first operator can adjust the height H of the workbench 102 (and the workpiece 150) and/or rotational orientation of the end effectors 126 and 136 (and the workpiece 150) by providing manually-selected command inputs using the input module 254.

Upon the first operator completing the work tasks to be completed on the workpiece 150 using the work station 100, the computer processor 250 could output control commands to the actuators 112 in the legs 104 and/or to the actuators 128 and 138 in the brackets 122 and 132, respectively, to adjust the height H of the workbench 102 (and the workpiece 150) and/or rotational orientation of the end effectors 126 and 136 (and the workpiece 150) to a position (e.g., to an ergonomically beneficial position) for removing the workpiece 150 from the work station 100. In the event that the first operator is to work on a subsequent workpiece that is identical to the first workpiece 150, the work station 100 may remain at the same height (of the workbench 102) and rotational orientation (of the end effectors 126 and 136) until the first operator has placed a second workpiece 150 on the work station 100. In the event that the first operator is to work on a subsequent workpiece that is different from the first workpiece 150, the computer processor 250 could output control commands to the actuators 112 in the legs 104, the actuators 129 and 139 of the first and second workpiece securing mechanisms, and the actuators 128 and 138 in the brackets 122 and 132 to facilitate fastening of the subsequent workpiece in the end effectors 126 and 136.

Thereafter, the computer processor can output control commands to the actuators 112, 129, 139, 128, and 138 to adjust the height H of the workbench 102 (and the workpiece 150) and/or rotational orientation of the end effectors 126 and 136 (and the second workpiece) for various tasks to be performed thereon by the first operator.

In the event the first operator does not complete the work tasks on a workpiece (e.g., the first workpiece 150 or a subsequent workpiece), a second operator may be assigned to complete work on that workpiece. In various aspects, the first operator could indicate to the computer processor 250 that he is leaving or otherwise finished with the work station 100. For example, the first operator could scan an identification badge using the badge reader 252 for a second time. In various aspects, the computer processor 250 could determine that the first operator is leaving the work station 100 by identifying an absence of an image of the first operator in a digital image obtained by the digital camera 266. Before, during, or after the first operator has moved away from the work station 100, the second operator can approach the work station 100 and identify himself and/or be identified by the computer processor 250. Again, for example, the second worker may scan an identification badge using the badge reader 252 and/or could provide other employee information using the input module 254. Also, the computer processor could recognize the second operator using facial rushing recognition from a digital image obtained by the digital camera 266 and/or by voice recognition using the microphone 264.

After the second operator has been identified, the computer processor 250 can output control commands to the actuators 112, 128, and 138 to adjust the height H of the workbench 102 (and a workpiece 150) and/or rotational orientation of the end effectors 126 and 136 (and the workpiece 150), that the first operator did not complete, to an ergonomically beneficial position for the second operator and for the first task to be completed by the second operator. Thereafter, the computer processor 250 can output control commands to the actuators 112, 128, and 138 to adjust the height H of the workbench 102 (and the workpiece 150) and/or rotational orientation of the end effectors 126 and 136 (and the workpiece 150) to ergonomically beneficial positions for subsequent tasks. Throughout the work on the workpiece 150, the second operator can adjust the height H of the workbench 102 (and the workpiece 150) and/or rotational orientation of the end effectors 126 and 136 (and the workpiece 150) by providing manual command inputs using the input module 254.

In the aspects described above, actuators 112 in the legs 108 of the workbench 102 adjust the legs 108 to change the height H of the workbench 102 above the ground. Changing the height H of the workbench 102 in turn changes the height of the end effectors 126 and 136 and a workpiece 150 held therebetween. In various aspects, the brackets 122 and 132 could include an adjustable dimension in a direction away from (and toward) the surface of the workbench 102. In such aspects, actuators (e.g., actuators 112) could be arranged with respect to the brackets 122 and 132 to cause the brackets to move away from or toward the surface of the workbench 102. Moving the brackets 122 and 132 away from the surface of the workbench 102 would increase the height above the ground of a workpiece 150 held by the end effectors 126 and 136. Moving the brackets 122 and 132 toward the surface of the workbench 102 would decrease the height above the ground of the workpiece 150 held by the end effectors 126 and 136. The movable brackets 122 and 132 could be used in combination with or as an alternative to the adjustable legs 108 to change the height above the ground of a workpiece 150.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects described herein may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., applications related to automatically adjusting the height and/or orientation of a workpiece for a particular operator) or related data available in the cloud. For example, a computer program to identify a particular operator and automatically adjust the height and/or orientation of a workpiece could execute on a computing system in the cloud and output control commands to actuators that adjust the height and/or orientation of the workpiece.

While the foregoing is directed to particular aspects, other and further aspects may be devised without departing from the basic scope thereof, and the scope thereof is determined by the claims that follow.

What is claimed is:

1. A computer-implemented method, comprising:
receiving electronic data that identifies a first operator from among a plurality of operators;
retrieving at least one of first anatomical data and first physiological data for the identified first operator from a data structure;
receiving an indication of a first task on a workpiece to be performed by the first operator;
automatically generating a first control command to a workpiece holding fixture to adjust at least one of a height and an orientation of the workpiece in the workpiece holding fixture, based on the retrieved at least one of first anatomical data and first physiological data and based on the first task;
determining, automatically, that the first task is complete;
identifying a second task on the workpiece to be performed by the first operator; and
automatically generating a second control command to the workpiece holding fixture to adjust at least one of the height and the orientation of the workpiece in the holding fixture, based on the retrieved at least one of first anatomical data and first physiological data and based on the second task.

2. The computer-implemented method of claim 1, further comprising:
receiving electronic data that identifies a second operator from among a plurality of operators;
retrieving at least one of second anatomical data and second physiological data for the identified first operator from the data structure; and
automatically generating at least one control command to the workpiece holding fixture to adjust at least one of the height and the orientation of the workpiece in the holding fixture, based on the retrieved at least one of second anatomical data and second physiological data.

3. The computer-implemented method of claim 1, further comprising:
receiving a manual command input to adjust at least one of the height and the orientation of the workpiece; and
generating at least one control command to the workpiece holding fixture to adjust at least one of the height and the orientation of a workpiece in the holding fixture, based on the manual command input.

4. An automated work station, comprising:
a workbench, wherein the workbench includes an actuator operable to adjust a height of the workbench;
a workpiece holding fixture arranged on the workbench, the workpiece holding fixture comprising:
a first workpiece securing mechanism operable to releasably secure a first end of a workpiece and to rotate the secured workpiece about an axis;
a second workpiece securing mechanism arranged along the axis and spaced apart from the first workpiece securing mechanism, wherein the second workpiece securing mechanism is operable to releasably secure a second end of the workpiece, opposite the first end, and to rotate the secured workpiece about the axis, wherein at least one of the first workpiece securing mechanism and the second workpiece securing mechanism is moveable along the axis to accommodate different workpieces having different distances between the first end and the second end; and
a drive mechanism operable to drive rotation of the end of the workpiece; and
an interface operable to:
receive a first one or more command signals from a computer system, the first one or more command signals generated based on at least one of anatomical data and physiological data for an operator, and based on an indication of a first task on the workpiece to be performed by the operator, wherein, in response to the first one or more command signals, the actuator adjusts the height of the workbench, and the drive mechanism adjusts a rotational orientation of the workpiece; and
receive a second one or more command signals from the computer system, the second one or more command signals generated based on the at least one of anatomical data and physiological data for the operator, based on an automatic determination that the first task is complete, and based on a second task to be performed by the operator, wherein, in response to the second one or more command signals, at least one of: the actuator adjusts the height of the workbench and the drive mechanism adjusts a rotational orientation of the workpiece.

5. The automated work station of claim 4, further comprising the computer system in communication with the interface, the computer system comprising:
a computer processor operable to receive an identification of the operator and, responsive to the received identification, operable to:
retrieve at least one of the anatomical data and physiological data for the operator from among a plurality of operators; and
output the first one or more command signals, based on the retrieved at least one of anatomical data and physiological data.

6. The automated work station of claim 5, wherein the computer system further comprises a badge reader operable to electronically scan operator identification badges and to output the identification of an operator associated with a scanned operator identification badge.

7. The automated work station of claim 5, wherein the computer system further comprises a camera operable to obtain an image of a face of an operator, and wherein the computer processor is further operable to match the obtained image to a stored image in a data structure containing stored images of faces of different operators.

8. The automated work station of claim 5, wherein the computer processor is further operable to:
receive the first task to be performed by the operator on the workpiece;
output the first one or more command signals based on the received first task;
determine, automatically, that the first task is complete;
identify a second task on the workpiece to be performed by the operator;
and
output the second one or more command signals, based on the received second task.

9. The automated work station of claim 4, wherein the first workpiece securing mechanism comprises:
a first bracket arranged on the workbench along the axis;
a first spindle arranged in the bracket along the axis; and
a first end effector arranged on the first spindle and adapted to releasably secure the first end of the workpiece; and
wherein the second workpiece securing mechanism comprises:
a second bracket arranged on the workbench along the axis;
a second spindle arranged in the bracket along the axis; and
a second end effector arranged on the second spindle and adapted to releasably secure the second end of the workpiece, wherein the drive mechanism rotates the second spindle.

10. The automated work station of claim 9, wherein the first end effector comprises different interchangeable end effectors that secure different workpieces.

11. The automated work station of claim 9, wherein the second end effector comprises different interchangeable end effectors that secure different workpieces.

12. A computer system for use with a fixture system having actuators, comprising:
a computer processor operable to receive an identification of a first operator and, responsive to the received identification, operable to:
retrieve at least one of first anatomical data and first physiological data for the first operator from among a plurality of operators;

receive an indication of a first task on a workpiece to be performed by the first operator;

output a first control command to an interface to cause a first actuator to adjust a height of the fixture relative to the ground, based on the retrieved at least one of first anatomical data and first physiological data and based on the first task;

output a second control command to a second actuator to adjust a rotational orientation of the fixture, based on the retrieved at least one of first anatomical data and first physiological data and based on the first task;

determine, automatically, that the first task is complete;

identify a second task on the workpiece to be performed by the first operator; and output, based the retrieved at least one of first anatomical data and first physiological data and based on the second task, a third control command to the interface to cause at least one of: the first actuator to adjust the height of the fixture relative to the ground and the second actuator to adjust the rotational orientation of the fixture.

13. The computer system of claim 12, further comprising a badge reader operable to electronically scan operator identification badges and to output to the computer processor the identification of a operator associated with a scanned operator identification badge.

14. The computer system of claim 12, further comprising a camera operable to obtain an image of a face of an operator, match the obtained image to a stored image in a data structure containing stored images of faces of different operators, and output the identification of the operator associated with the matched stored image.

15. The computer system of claim 12, further comprising at least one input in communication with the computer operable to receive a manually-selected command input to adjust at least one of the height of the fixture and the rotational orientation of the fixture, and wherein the at least one input is operable to output adjustment commands to the actuators and a drive mechanism in response to the manually-selected command input.

16. The computer system of claim 12, wherein the computer processor is further operable to:

receive at least one of second anatomical data and second physiological data for a second operator from among the plurality of operators;

output another first control command to the first actuator to adjust the height of the workbench, based on the retrieved at least one of second anatomical data and second physiological data; and output another second control command to a drive mechanism to adjust a rotational orientation of the workpiece, based on the retrieved at least one of second anatomical data and second physiological data.

* * * * *